United States Patent [19]
Hintz

[11] Patent Number: 5,458,941
[45] Date of Patent: Oct. 17, 1995

[54] OPTICAL RECORDING MEDIUM EXHIBITING EUTECTIC PHASE EQUILBRIA

[75] Inventor: Michael B. Hintz, Mahtomedi, Minn.

[73] Assignee: Minnesota Mining and Manufacturing Company, St. Paul, Minn.

[21] Appl. No.: 257,076

[22] Filed: Jun. 9, 1994

[51] Int. Cl.6 ................................................. B32B 3/00
[52] U.S. Cl. ...................... 428/64.4; 428/457; 428/913; 430/270; 430/945; 369/288; 346/135.1
[58] Field of Search ................................. 428/64, 65, 457, 428/913; 430/270, 945; 346/76 L, 135.1; 369/288

[56] References Cited

U.S. PATENT DOCUMENTS

| | | | |
|---|---|---|---|
| 4,477,819 | 10/1984 | Lee et al. | 346/76 L |
| 4,717,628 | 1/1988 | Takahashi et al. | 428/457 |
| 4,772,897 | 9/1988 | Ohkawa | 346/135.1 |
| 4,847,132 | 7/1989 | Takao et al. | 428/64 |
| 4,956,243 | 9/1990 | Miyake et al. | 428/694 |
| 5,040,166 | 8/1991 | Kobayashi et al. | 369/275.2 |
| 5,090,009 | 2/1992 | Hamada et al. | 369/284 |
| 5,093,174 | 3/1992 | Suzuki et al. | 428/64 |
| 5,128,099 | 7/1992 | Strand et al. | 420/579 |
| 5,233,575 | 8/1993 | Uchino et al. | 369/13 |
| 5,283,094 | 2/1994 | Sasakawa | 428/64 |
| 5,325,351 | 6/1994 | Uchiyama | 428/64 |
| 5,346,740 | 9/1994 | Ohno | 428/64 |

FOREIGN PATENT DOCUMENTS 6-171236  6/1994  Japan .

Primary Examiner—Patrick J. Ryan
Assistant Examiner—Elizabeth Evans
Attorney, Agent, or Firm—Gary L. Griswold; Walter N. Kim; Eric D. Levinson

[57] ABSTRACT

A multilayer optical recording medium comprising a substrate, an optional dielectric layer, a first recording layer, a second recording layer, and an optional protective layer. The first recording layer comprises an alloy of a metal and at least one doping element, and the second recording layer comprises a semiconductor. A binary combination of the metal of the first recording layer and the semiconductor of the second recording layer exhibits eutectic phase equilibria.

19 Claims, 2 Drawing Sheets

OPTICAL RECORDING MEDIUM EXHIBITING EUTECTIC PHASE EQUILBRIA

FIELD OF THE INVENTION

This invention relates to optical recording media which comprise a stack of thin film layers on a substrate.

BACKGROUND OF THE INVENTION

User-recordable optical recording systems typically comprise a focused laser beam for reading and recording, and an optical recording medium, such as a recordable compact disk (CD-R) or a magneto-optical disk. The medium generally includes several thin layers of material applied to a transparent substrate.

During recording, the laser beam is scanned over the recording medium while the laser power is modulated according to the input data stream. Energy absorbed from the laser causes a localized change in the physical properties of one or more layers of the medium, resulting in an optically readable mark such as a pit, bubble, or region of altered complex refractive index. Recorded information is subsequently reproduced by scanning the medium with the same laser beam at a reduced power level. For the case of a CD-R medium, the reflectivity of the written marks is decreased relative to that of the surrounding unwritten areas, causing a modulation in the reflected light intensity as the read beam scans the medium. This modulation can be converted to an electrical signal by a photodetector.

The compact disk format was originally designed as a user-read-only-memory system for use with prerecorded media in the information storage (CD-ROM) and sound recording (CD audio) fields. The prerecorded media generally have an injection molded substrate in which pits have already been formed, with a metal reflective layer deposited over the pits. These media were designed to exhibit a reflectance of about 0.75 (measured at a wavelength of 780 nm) from a flat unrecorded region of the media surface, so as to be easily readable by inexpensive CD players. The popularity of the CD format has resulted in a large number of installed CD players which are designed for operation with these highly reflective media.

The demand for user-recordable compact disk (known as CD-R) media is currently rising. An attractive feature of a CD-R medium is that, once recorded, it can be played back using any existing conventional CD audio or CD-ROM player. To ensure compatibility with existing CD players, it is desirable that CD-R media meet international specifications requiring a reflectance of $\geq 0.70$ from a flat region of the disk, and a recording power of 4 to 8 mW. Taken together, these two requirements place considerable constraints on the design of CD-R media.

Current CD-R media constructions are typically based upon a recording layer of organic dye, which is deposited by spin coating. The recording layer is covered by a metallic reflector layer made of a material such as gold, which is generally sputter-deposited. While such constructions record satisfactorily, they have a number of associated disadvantages. For example, the manufacture of such media is relatively costly. In addition, the dye spectral response of the media is so narrow that the media may not be compatible with recorders from different manufacturers (which typically have slightly different laser wavelengths). Long term environmental and archival stability of the dye-based CD-R media is also questionable.

As an alternative to the dye-based media constructions, it is known that the necessary reflectance can generally be achieved by employing a media construction containing at least one layer of a metal such as gold, silver, copper or aluminum. However, recording directly on these metal layers requires prohibitively high laser power because of the high melting points and high thermal conductance of the metal layers. High thermal conductance causes heat from the laser to be rapidly dissipated from the recording area.

SUMMARY OF THE INVENTION

The present invention provides an optical recording medium with sufficiently high reflectance and acceptable recording power for use in recordable compact disk (CD-R) applications. The medium comprises, in order, a transparent substrate, a first recording layer comprising an alloy of a metal and at least one doping element, and a second recording layer comprising a semiconductor. An optional dielectric layer may be provided between the substrate and the first recording layer, and an optional protective layer may be provided on the second recording layer. A metal is herein defined as an elemental material having the ability to form cations by the loss of electrons, and generally characterized by bulk properties of high electrical and thermal conductance, ductility, malleability, and a lustrous appearance. A semiconductor is a material having electrical resistance greater than a metal, and generally in the range from $10^{-2}$ to $10^9$ ohm-cm. Doping is defined as the introduction of a small quantity of material into the bulk of another material with the intention of changing the physical properties of the bulk material.

The metal in the first recording layer and the semiconductor in the second recording layer are chosen so as to exhibit binary eutectic phase equilibria. Eutectic phase equilibria means that for certain intermediate compositions of particular binary combinations of elements or compounds, the mixture will melt at a temperature considerably below the melting temperature of either constituent by itself. The alloy of the metal and the doping element is selected from the group consisting of aluminum-chromium (Al-Cr), gold-cobalt (Au-Co), and aluminum-titanium (Al-Ti), and is most preferably Al-Cr. The purpose of the doping element is to reduce thermal conductance of the first recording layer. As thermal and electrical conductance are interrelated, electrical conductance is used as a relative measure of thermal conductance for the purposes of this invention.

The doping element is present in sufficient quantity such that the sheet electrical conductance of the medium is reduced to less than 0.1 siemens (S). The semiconductor is selected from the group consisting of germanium (Ge), silicon (Si), and combinations thereof, and is most preferably Ge. The flat surface reflectance of the medium at 780 nm is preferably in the range from about 0.55 to about 0.85, more preferably from about 0.70 to about 0.80. The optional dielectric layer and the optional protective layer each provide the medium with greater environmental stability than a medium without the additional layer or layers.

The present invention also includes an optical recording system having a focused laser beam, a photodetector, and the medium described above.

DETAILED DESCRIPTION

Figure 1:
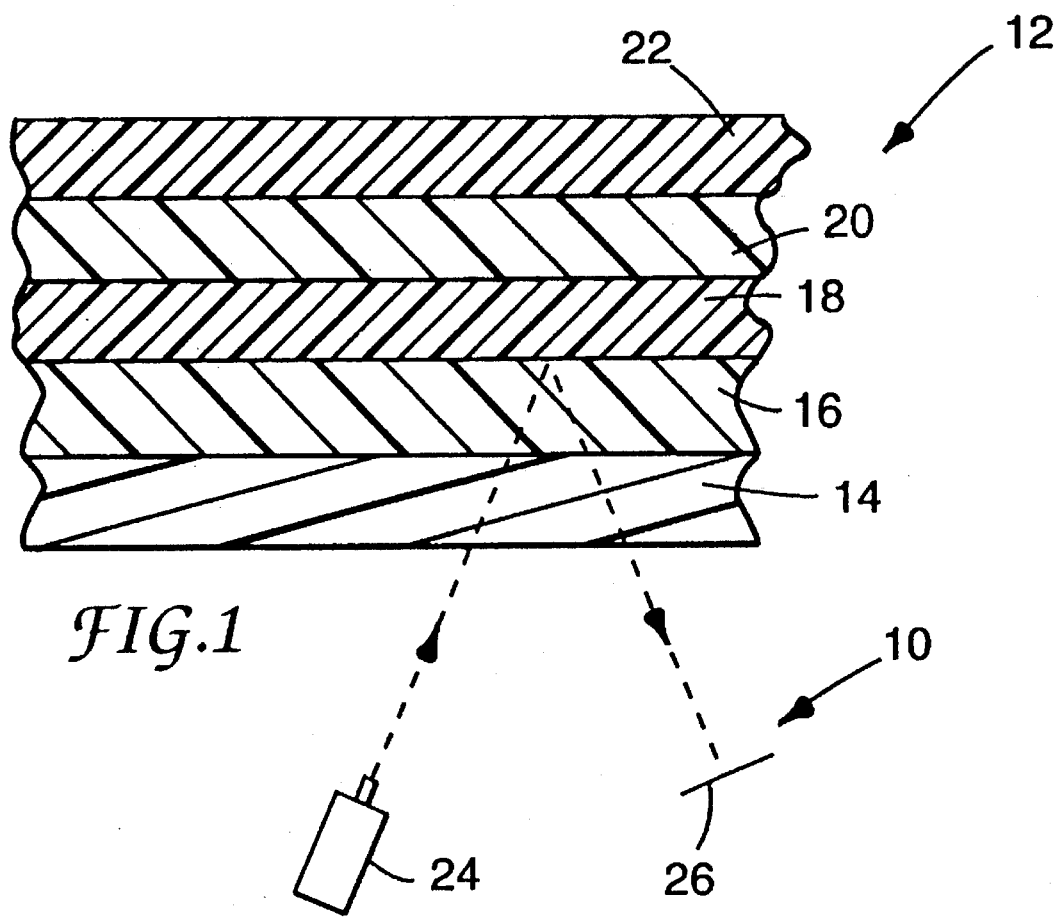
FIG. 1 is a schematic diagram of an optical recording system according to the present invention.

Referring now to the drawings, there is shown in FIG. 1 an optical recording system 10 according to the present invention. System 10 comprises medium 12, laser 24, and photodetector 26. Medium 12 comprises, in order, transparent substrate 14, optional dielectric layer 16, first recording layer 18, second recording layer 20 and optional protective layer 22. To read and record information, a focused laser beam of suitable power from laser 24 enters the medium through substrate 14, passes through optional dielectric layer 16, is substantially reflected from first and second recording layers 18 and 20 and exits the medium through substrate 14 along the path shown before entering photodetector 26.

Substrate 14 may be formed of any material having high transparency to laser beams which is also nonmagnetic and dimensionally stable. The substrate is usually made of a polymeric resin having excellent impact strength such as a polycarbonate, a polymethylmethacrylate, an acrylate or an epoxy. For CD-R applications, the substrate is typically a disk having a nominal diameter of 120 mm and containing preformed spiral grooves on one side for tracking purposes.

Optional dielectric layer 16 may be deposited on the grooved side of substrate 14. The dielectric layer offers resistance to degradation of the medium by environmental factors such as heat and moisture, and may also provide enhancement of the carrier-to-noise ratio of the medium. A dielectric material is typically characterized by high electrical resistance, thus having the ability to serve as an insulator. For the medium of this invention, silicon dioxide or aluminum oxide is preferred for the dielectric layer, although other substantially transparent dielectric materials such as silicon nitride, tantalum oxide, silicon carbide, borosilicate glass, yttrium oxide, and the like, may be used.

First recording layer 18, deposited either on substrate 14 or on optional dielectric layer 16, absorbs a small portion of the power delivered by the laser beam. Most of the rest of the power from laser 24 is reflected from the first recording layer back out of the medium, with a small amount being transmitted through the layer. The first recording layer comprises an alloy of a metal and at least one doping element. The metal provides the high reflectance needed for a recordable compact disk medium, while the presence of the doping element in sufficient quantity has been observed to reduce the sheet electrical conductance of the medium as compared to a medium without the doping element. Preferred alloys include Al-Cr, Au-Co, and Al-Ti. The doping element is preferably present in the range from about 1 to about 12 atomic %. The first recording layer is sufficiently thick to provide the desired reflectance, typically in the range from about 5 to 40 nm.

Second recording layer 20, adjacent to first recording layer 18, comprises a semiconductor. Preferred semiconductors include Ge, Si, or combinations thereof. The second recording layer may also include an additional material alloyed with the semiconductor in the range from 0 to 30 atomic %. The additional material may comprise aluminum, chromium, oxygen, titanium, tantalum, or other elements, or combinations thereof. The thickness of the second recording layer is preferably in the range from about 20 to about 100 nm.

Figure 2:
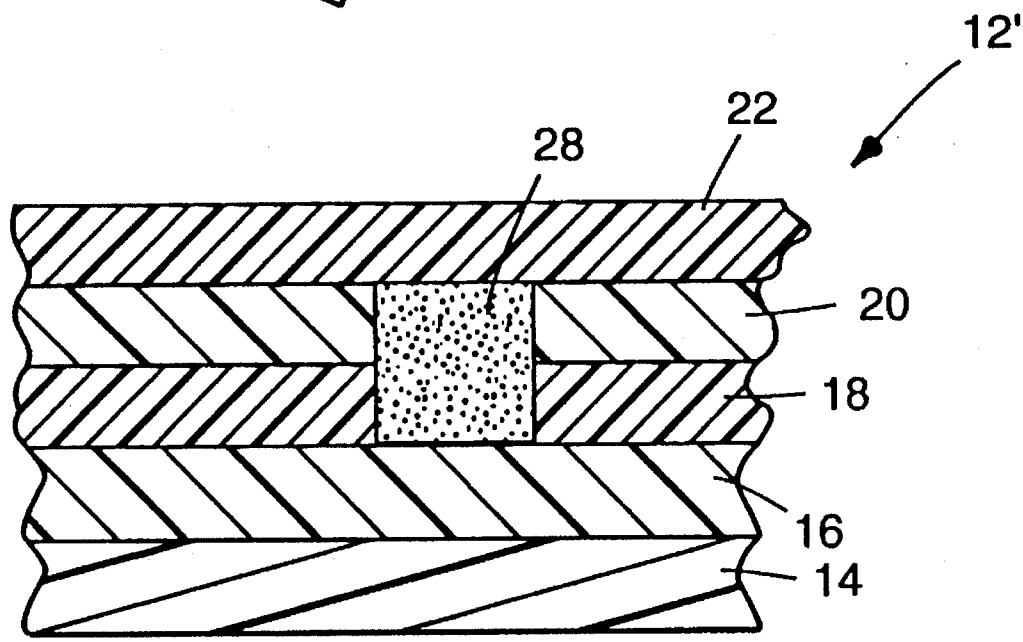
FIG. 2 is a schematic diagram of the medium shown in FIG. 1 after optical recording.

During recording, laser 24 is operated at a power sufficient to heat first recording layer 18 and second recording layer 20 in a localized area to a temperature at which the two layers melt and mix together. Upon resolidification, a substantially amorphous recorded spot 28 is formed in medium 12 as shown in FIG. 2.

In order to facilitate the recording process, the materials for the first and second recording layers are particularly chosen so that the metal and the semiconductor exhibit binary eutectic phase equilibria. Binary combinations of such materials are generally characterized by a positive (i.e., endothermic) enthalpy of mixing. Eutectic binary phase diagrams show that certain intermediate compositions of two constituents will form a liquid phase at temperatures considerably below the melting temperature of either constituent alone. As a consequence of this phase behavior, thin contiguous layers of eutectic pairs such as Ge and Al can be expected to begin localized interfacial melting at a temperature well below the melting temperature of either individual layer. The molten regions are believed to intermix to a sufficient degree so as to form the amorphous spot described previously. In the recording medium of this invention, a spot believed to have been created in this manner has been observed to exhibit a reflectance significantly different from that of the original layered structure, as will be explained in the subsequent examples.

Optional protective layer 22 is deposited on the second recording layer to protect the materials in recording layers 18 and 20 from reacting with elements in the surrounding environment. The protective layer may also provide enhancement of the carrier-to-noise ratio of the medium. Protective layer 22 preferably comprises a dielectric material such as yttrium oxide, aluminum oxide, silicon carbide, silicon nitride or silicon dioxide, although other known dielectric materials may be used. Protective layer 22 typically has a thickness in the range from about 10 to 100 nm.

In addition to the substrate, optional dielectric layer, first and second recording layers, and optional protective layer, the optical recording medium of the present invention may also contain additional layers such as seal coatings and screen-printed graphic designs known to be useful in optical recording media.

The optical recording medium of this invention is particularly characterized by its reflectance, optimum recording power, and sheet electrical conductance. The reflectance (R), when measured on the flat unrecorded surface of the medium at a wavelength of 780 nm, is preferably in the range from 0.55 to 0.85, and more preferably from 0.70 to 0.80. Optimum recording power ($P_o$) is defined as the laser power used for recording ($P_{write}$) at the maximum carrier-to-noise ratio (CNR) of the output signal. $P_o$ is preferably in the range from 4 to 12 mW, and more preferably from 4 to 8 mW.

Functionally, it is known that reducing thermal conductance of the first recording layer allows heat generated by the incident laser beam during recording to be more effectively retained in the localized recording area. Since electronic contributions to electrical and thermal conductance are related by the Wiedemann-Franz law, as described in *J. Appl. Phys*, Vol. 67, p. 6914 (1990), electrical conductance is considered to be a relative indicator of recording power.

Sheet electrical conductance (σ) is the type of conductance measurement used for the purposes of this invention. It has indeed been observed in the media of this invention that $P_o$ generally correlates with σ, as will be described in the subsequent examples. Sheet electrical conductance is preferably in the range from 0.01 to 0.1 siemens, (S), and more preferably from 0.01 to 0.05 S.

The layers comprising the optical recording medium of this invention can be made by known vacuum deposition techniques which are capable of producing thin films of uniform and controllable thicknesses; of these techniques, sputtering is preferred. Useful sputtering techniques include RF and DC magnetron, triode, diode, and ion-beam. Films containing more than one elemental constituent may be formed by sputtering from alloyed targets, cosputtering two or more single-constituent targets simultaneously to form a stack of layers, or a combination of both techniques. In the case of cosputtering, the layers are sufficiently thin (one atomic layer or less each) so as to perform collectively as a single, alloyed film.

The invention will be further clarified by considering the examples which follow. For the purposes of these examples, the flat surface reflectance (R) and the transmittance (T) of the medium were measured in the wavelength range of 650 nm to 850 nm using a LAMBDA-9 (Perkin-Elmer) spectrophotometer. The absorbance (A) of the medium was then calculated according to the formula A=1−(R+T). Sheet electrical conductance (σ) was measured using a contactless, high frequency eddy current measurement system. To test the medium for optical recording performance, a mark was recorded on the coated disk using a 780 nm wavelength laser. The laser power was modulated at 0.75 MHz or 0.72 MHz recording frequency using a 50% duty cycle. The surface velocity of the disk was approximately 1.2 m/sec, resulting in a recorded mark which corresponded approximately to the shortest mark used in CD recording. The carrier-to-noise ratio (CNR) was measured as a function of recording power ($P_{write}$) using a spectrum analyzer at 10 kHz resolution bandwidth. The optimum recording power ($P_o$) was identified as the recording power which produced the maximum CNR. In order to normalize variations in recording frequency and media reflectivity, $P_o$ was incorporated into another recording parameter, energy per recorded mark ($E_w$), which is given by the following formula:

$E_w = P_o . A . t_w$ where A is the absorbance of the medium and $t_w$ is the duration of the recording pulse (667 ns or 694 ns in these examples). Since $E_w$ combines input recording power with the reflective properties of the medium, it is convenient and more functional when analyzing a number of media samples to use $E_w$ rather than $P_o$ for comparison with sheet electrical conductance.

The present invention will now be further illustrated by the following non-limiting Examples. (All measurements are approximate.)

EXAMPLE 1

A set of optical recording media according to this invention was prepared using magnetron sputtering in a batch vacuum deposition system. The working gas during deposition was Ar at a pressure of about 2 mTorr. Substrates included a 120 mm diameter, 1.2 mm thick polycarbonate disk having on one side tracking grooves with 1.6 μm track pitch, 2.5 cm by 7.6 cm glass microscope slides, and a 5.1 cm diameter silicon wafer.

The resulting media had four layers: A dielectric layer containing yttrium oxide and about 10% by weight silicon carbide was deposited first on the substrates at about 10 nm thickness. The first recording layer, deposited next, was an Al-Cr alloy at about 20 nm thickness. The Cr content in the alloy, measured by inductively coupled plasma analysis, was about 3 atomic %. The second recording layer followed, comprising Ge at about 50 nm thickness. Finally, an approximately 10 nm thick protective layer containing yttrium oxide and 10% by weight silicon carbide was deposited over the second recording layer.

The flat surface reflectance (R) of the glass microscope slide substrate coated with the four thin film layers was measured through the substrate. At 780 nm, R was found to be 0.763, and A was 0.223. Sheet electrical conductance (σ) measured on the same coated glass slide was 0.0648 S. CNR was measured as a function of $P_{write}$, giving a $P_o$ of 11.4 mW. $E_w$ was calculated to be $1.76 \times 10^{-9}$ J. This medium meets the current CD-R standard for reflectance.

EXAMPLES 2–8

Examples 2 through 8 were prepared in the same manner as Example 1, except for varying the concentration of Cr in the first recording layer. Example 2, containing essentially no Cr, is included for comparative purposes. Optical and recording property data for each example, including Example 1, are shown in Table 1. For the case of Example 2, the optimum recording power $P_o$ could not be measured directly as it exceeded the 20 mW laser power limit of the available optical recorder. $P_o$ was therefore estimated by extrapolating the initial portion of a CNR vs. $P_{write}$ curve.

TABLE 1

| Example | Cr concentration [atomic %] | R @ 780 nm | A @ 780 nm | σ [S] | $t_w$ [ns] | $P_o$ [mW] | $E_w$ [J] |
| --- | --- | --- | --- | --- | --- | --- | --- |
| 2 | 0.1 | 0.770 | 0.217 | 0.3175 | 694 | 23.0 (estimated) | $3.46 \times 10^{-9}$ |
| 3 | 0.7 | 0.770 | 0.216 | 0.2075 | 694 | 17.6 | $2.64 \times 10^{-9}$ |
| 4 | 1.0 | 0.770 | 0.214 | 0.1584 | 694 | 16.3 | $2.42 \times 10^{-9}$ |
| 5 | 1.3 | 0.770 | 0.215 | 0.1333 | 694 | 15.7 | $2.34 \times 10^{-9}$ |
| 6 | 1.4 | 0.768 | 0.217 | 0.1086 | 694 | 14.1 | $2.12 \times 10^{-9}$ |
| 7 | 2.3 | 0.768 | 0.218 | 0.0875 | 694 | 12.8 | $1.94 \times 10^{-9}$ |
| 1 | 3.0 | 0.763 | 0.223 | 0.0648 | 694 | 11.4 | $1.76 \times 10^{-9}$ |
| 8 | 4.5 | 0.749 | 0.237 | 0.0460 | 694 | 9.5 | $1.56 \times 10^{-9}$ |

Figure 3:
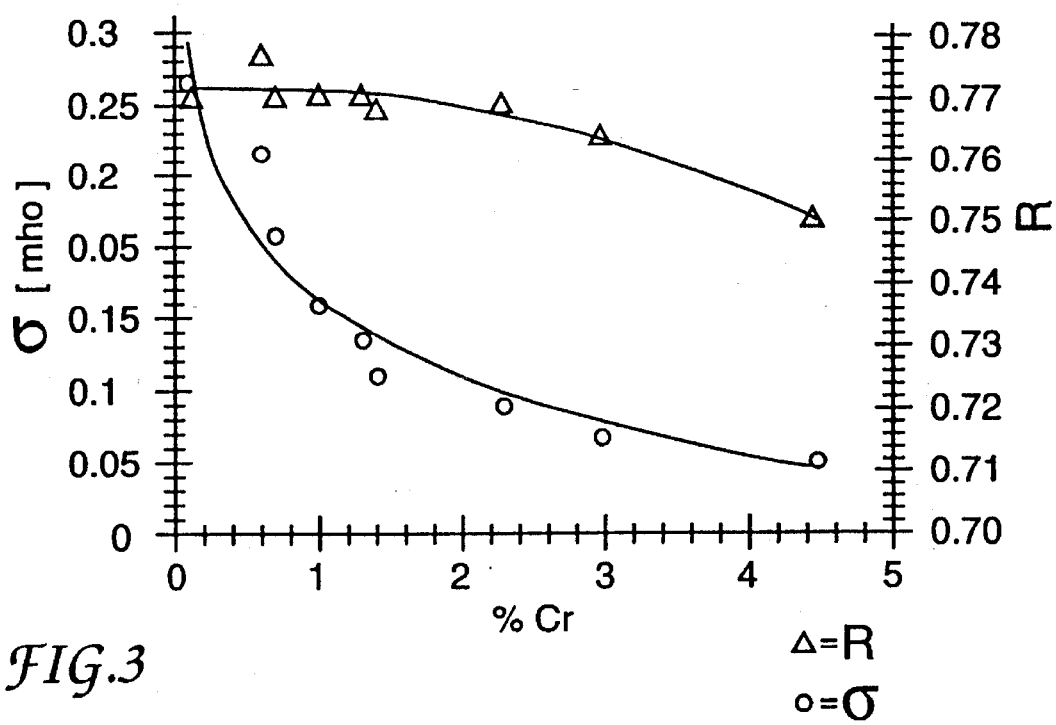
FIG. 3 is a graphical representation of the relationship between concentration of doping element in the first recording layer and both sheet electrical conductance (σ) and reflectance (R) for several embodiments of an optical recording medium according to the present invention.
Figure 4:
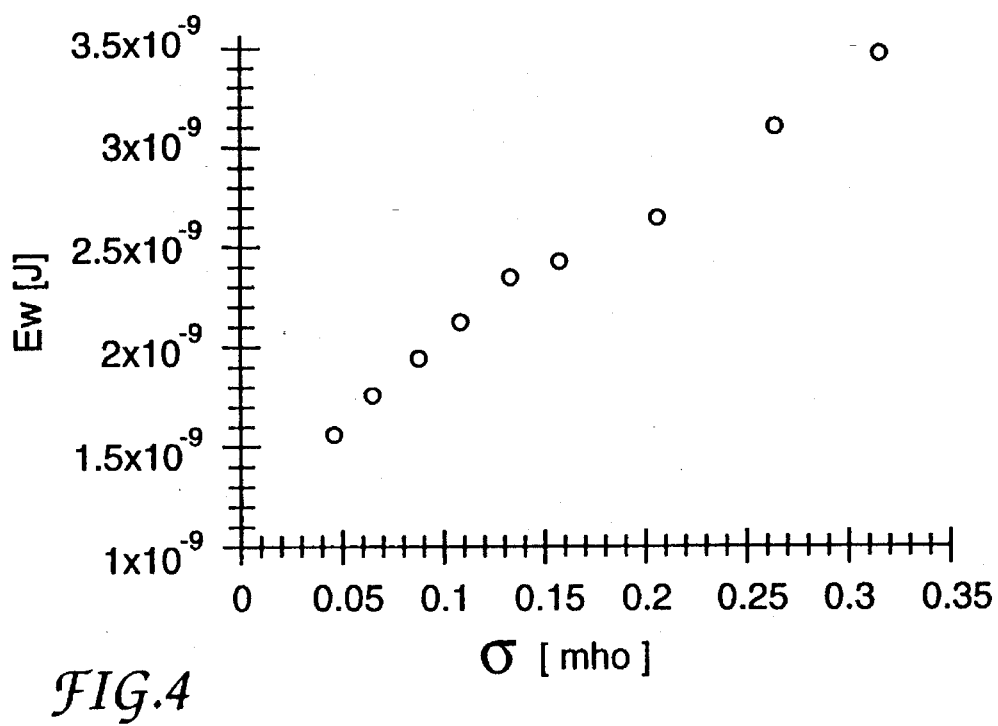
FIG. 4 is a graphical representation of the relationship between sheet electrical conductance (σ) and energy per recorded mark ($E_w$) for the same embodiments of the optical recording medium as represented in FIG. 3.

These examples demonstrate that σ, $P_o$ and $E_w$ are steadily reduced with increasing Cr concentration in the first recording layer, while R does not begin to fall significantly until the Cr concentration exceeds about 3 atomic %. At 4.5 atomic % Cr, the R value of 0.749 is still well within current specifications for CD-R media flat surface reflectance. The effect of Cr concentration on both a and R for the media of these examples is graphically illustrated in FIG. 3. As shown in FIG. 4, energy per recorded mark ($E_w$) increases directly with sheet electrical conductance in a nearly linear relationship. This figure demonstrates the benefits of reducing a in order to reduce the power required to record on an optical recording medium.

EXAMPLES 9–13

Examples 9–13 were prepared in the same manner as Example 1, except that the metal-doping element alloy in the first recording layer was Au-Co, the Co concentration was varied, the first recording layer was deposited directly on the substrate with no dielectric layer, and the protective layer comprised borosilicate glass. In the resulting media, the approximate layer thicknesses were as follows: first recording layer, 30 nm; second recording layer, 50 nm; and protective layer, 15 nm. The Co concentration in the first recording layer was determined as a calculated value of atomic % for each example, based upon the volume fraction of Co in the layer and the atomic weights and densities of elemental Co and Au. Example 9, essentially containing no Co, was included for comparative purposes. Optical and recording property data for each example are shown in Table 2.

TABLE 2

| Example | Co concentration [atomic %] | R @ 780 nm | A @ 780 nm | σ [S] | $t_w$ [ns] | $P_o$ [mW] | $E_w$ [J] |
| --- | --- | --- | --- | --- | --- | --- | --- |
| 9 | 0 | 0.826 | 0.153 | 0.2065 | 667 | 18.0 | $1.84 \times 10^{-9}$ |
| 10 | 3.05 | 0.830 | 0.151 | 0.1161 | 667 | 15.0 | $1.51 \times 10^{-9}$ |
| 11 | 7.5 | 0.810 | 0.170 | 0.0860 | 667 | 12.8 | $1.46 \times 10^{-9}$ |
| 12 | 14.6 | 0.787 | 0.199 | 0.0636 | 667 | 11.0 | $1.46 \times 10^{-9}$ |
| 13 | 27.8 | 0.730 | 0.254 | 0.0508 | 667 | 7.8 | $1.32 \times 10^{-9}$ |

The trend is the same as in the previous examples, with σ, $P_o$ and $E_w$ decreasing as the Co concentration in the first recording layer increases. In these examples, R does not begin to fall significantly until the Co concentration exceeds about 14.6 atomic %.

I claim:

1. An optical recording medium comprising, in order:
   a transparent substrate;
   a first recording layer comprising an alloy of a metal and at least one doping element; and
   a second recording layer comprising a semiconductor, wherein a binary combination of the metal and the semiconductor exhibits eutectic phase equilibria.

2. The medium of claim 1, further comprising a protective layer on a side of the second recording layer opposite the substrate.

3. The medium of claim 1, further comprising a dielectric layer between the substrate and the first recording layer.

4. The medium of claim 3, wherein the dielectric layer comprises a material selected from the group consisting of aluminum oxide, silicon dioxide, and combinations thereof.

5. The medium of claim 1, wherein the alloy is selected from the group consisting of Al-Cr, Au-Co, and Al-Ti.

6. The medium of claim 5, wherein the alloy is Al-Cr.

7. The medium of claim 1, wherein the doping dement is present in sufficient quantity such that the sheet electrical conductance of the medium is less than 0.1 siemens.

8. The medium of claim 1, wherein the doping element is present in the alloy in the range from about 1 to about 12 atomic %.

9. The medium of claim 1, wherein the semiconductor is selected from the group consisting of Si, Ge, and combinations thereof.

10. The medium of claim 1, wherein the semiconductor is alloyed with at least one additional material, wherein the additional material is present in the range from 0 to 30 atomic %.

11. The medium of claim 9, wherein the semiconductor is Ge.

12. The medium of claim 1, wherein the flat surface reflectance (R) of the medium at 780 nm wavelength is in the range from 0.55 to 0.85.

13. An optical recording medium comprising, in order:
    a transparent substrate;
    a dielectric layer;
    a first recording layer comprising an alloy of Al and Cr, wherein the Cr is present in a quantity between 2.5 and 4 atomic %;
    a second recording layer comprising Ge; and
    a protective layer.

14. An optical recording system comprising:
    a medium, comprising, in order:
      a transparent substrate;
      a first recording layer comprising an alloy of a metal and at least one doping element;
      a second recording layer comprising a semiconductor, wherein a binary combination of the metal and the semiconductor exhibits eutectic phase equilibria; and
      a protective layer;
    a focused laser beam positioned to enter the medium through the substrate, wherein the laser beam is capable of heating the first and second recording layers until localized melting and endothermic mixing of the two layers occur, thereby causing a recorded spot to be formed in the medium, wherein the recorded spot has a reflectance lower than the reflectance of the surrounding unrecorded regions; and
    a photodetector positioned to detect the reflected laser beam exiting the medium.

15. The system of claim 14, wherein the alloy is Al-Cr.

16. The system of claim 14, wherein the doping element is present in sufficient quantity such that the sheet electrical conductance of the medium is less than 0.1 siemens.

17. The system of claim 14, wherein the semiconductor is Ge.

18. The system of claim 14, wherein the flat surface reflectance (R) of the medium at 780 nm wavelength is in the range from 0.55 to 0.85.

19. The system of claim 14, further comprising a dielectric layer between the substrate and the first recording layer.

* * * * *

UNITED STATES PATENT AND TRADEMARK OFFICE
CERTIFICATE OF CORRECTION

PATENT NO.: 5,458,941

DATED: October 17, 1995

INVENTOR(S): Michael B. Hintz

It is certified that error appears in the above-identified patent and that said Letters Patent is hereby corrected as shown below:

Column 7, line 5, after "both" and before "and," "a" should read --σ--.

Column 7, line 9, after "reducing" and before "in," "a" should read --σ--.

Column 8, line 1, "dement" should read --element--.

Signed and Sealed this

Sixteenth Day of January, 1996

Attest:

BRUCE LEHMAN

Attesting Officer

Commissioner of Patents and Trademarks